(12) United States Patent
Lanni

(10) Patent No.: US 7,453,171 B2
(45) Date of Patent: Nov. 18, 2008

(54) DC POWER SOURCE DETERMINATION CIRCUITRY FOR USE WITH AN ADAPTER

(75) Inventor: Thomas W. Lanni, Laguna Niguel, CA (US)

(73) Assignee: Comarco Wireless Technologies, Inc, Lake Forest, CA (US)

( * ) Notice: Subject to any disclaimer, the term of this patent is extended or adjusted under 35 U.S.C. 154(b) by 377 days.

(21) Appl. No.: 10/758,933

(22) Filed: Jan. 15, 2004

(65) Prior Publication Data

US 2005/0162020 A1 Jul. 28, 2005

(51) Int. Cl.
*G05F 3/06* (2006.01)
(52) U.S. Cl. .................................. 307/151; 363/142
(58) Field of Classification Search ................ 307/130, 307/43, 151; 320/162; 700/22; 363/142
See application file for complete search history.

(56) References Cited

U.S. PATENT DOCUMENTS

| | | | | |
|---|---|---|---|---|
| 5,969,438 | A | 10/1999 | Odaohara et al. ............. | 307/80 |
| 6,054,846 | A * | 4/2000 | Castleman ................... | 323/283 |
| 6,288,522 | B1 | 9/2001 | Odaohhara et al. .......... | 320/138 |
| 6,528,970 | B1 | 3/2003 | Liu et al. ..................... | 320/107 |
| 6,567,565 | B1 | 5/2003 | Klassen ....................... | 361/679 |
| 6,628,535 | B1 * | 9/2003 | Wu .............................. | 363/146 |
| 6,751,109 | B2 * | 6/2004 | Doss et al. ................... | 363/142 |
| 6,795,302 | B2 | 9/2004 | Kluth et al. .................. | 361/679 |
| 6,903,950 | B2 | 6/2005 | Afzal et al. .................. | 363/142 |
| 2004/0075419 | A1 * | 4/2004 | Massey et al. ............... | 320/117 |
| 2005/0127758 | A1 * | 6/2005 | Atkinson et al. ............. | 307/80 |

OTHER PUBLICATIONS

European Search Report dated Sep. 19, 2006 for corresponding EP patent application No. EP 05 25 0133.

* cited by examiner

*Primary Examiner*—Michael J Sherry
*Assistant Examiner*—Daniel Cavallari
(74) *Attorney, Agent, or Firm*—Pillsbury Winthrop Shaw Pittman LLP

(57) ABSTRACT

An adapter device includes a DC/DC adapter to receive DC power from a DC power source, and output a regulated DC voltage ($V_{out}$). A source determination circuitry receives the DC power from the DC power source and compares a magnitude of a voltage of the DC power with a reference magnitude of a reference voltage ($V_{ref}$). When the magnitude of the voltage of the DC power is greater than the reference magnitude, a data signal ($V_{data}$) having a first value is output. When the magnitude of the voltage of the DC power is less than the reference magnitude, the $V_{data}$ signal having a second value is output. The $V_{data}$ signal is received by control circuitry of an electronic device. When the $V_{data}$ signal has the first value, the electronic device operates in a first mode where battery charging circuitry is disabled. When the $V_{data}$ signal has the second value, the battery charging circuitry is enabled.

16 Claims, 10 Drawing Sheets

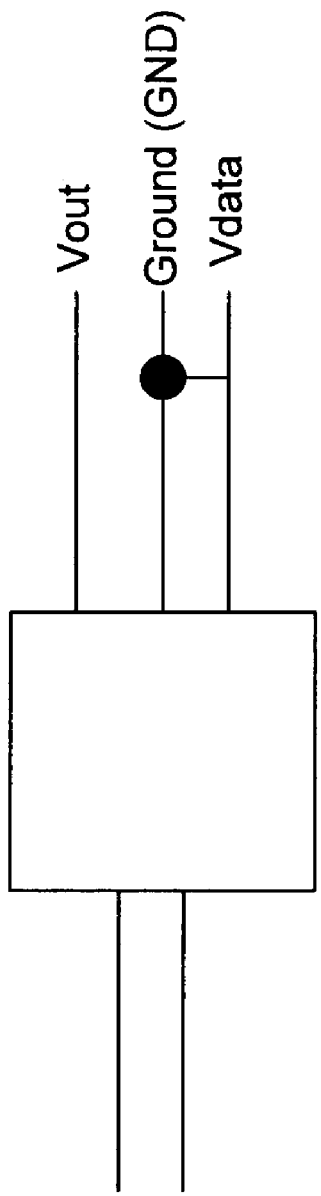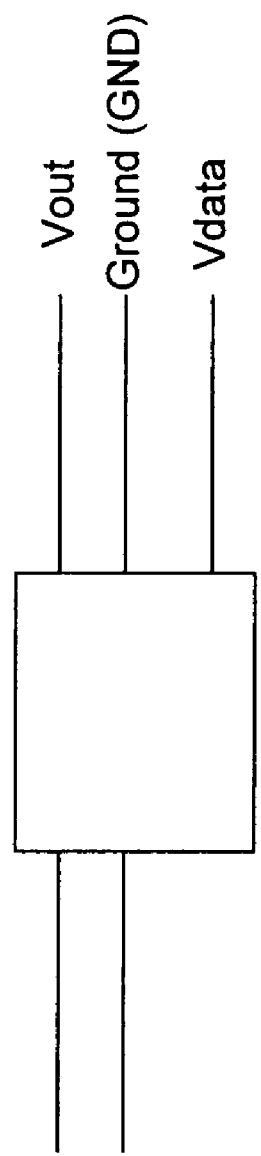

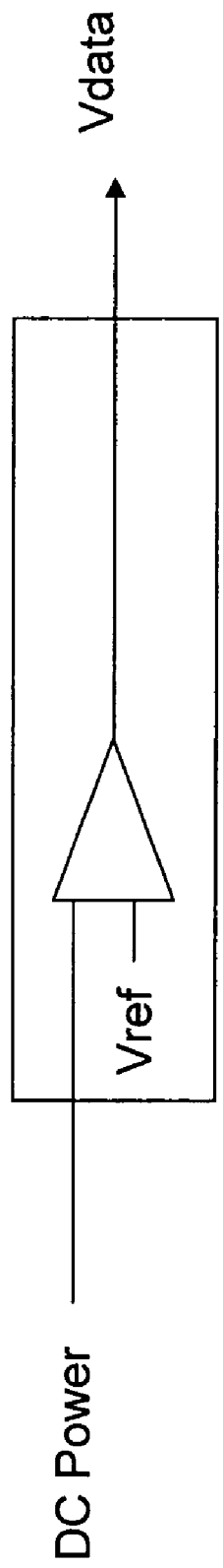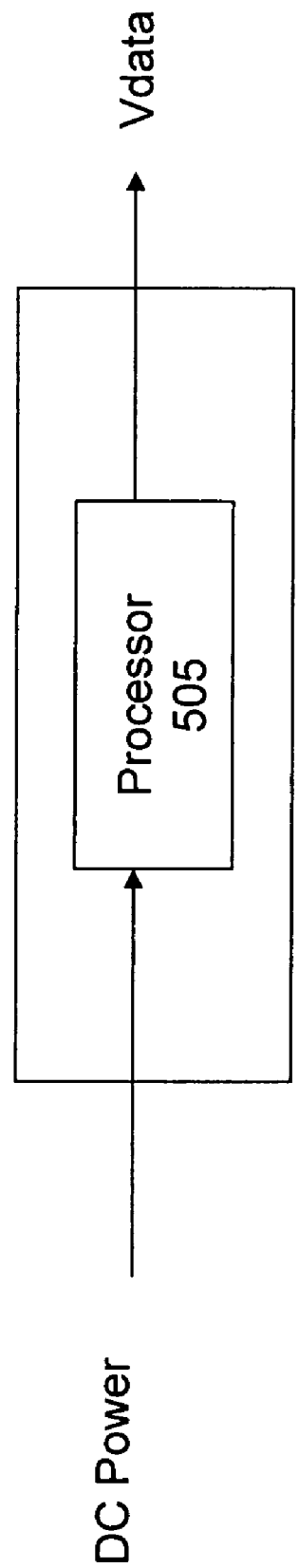

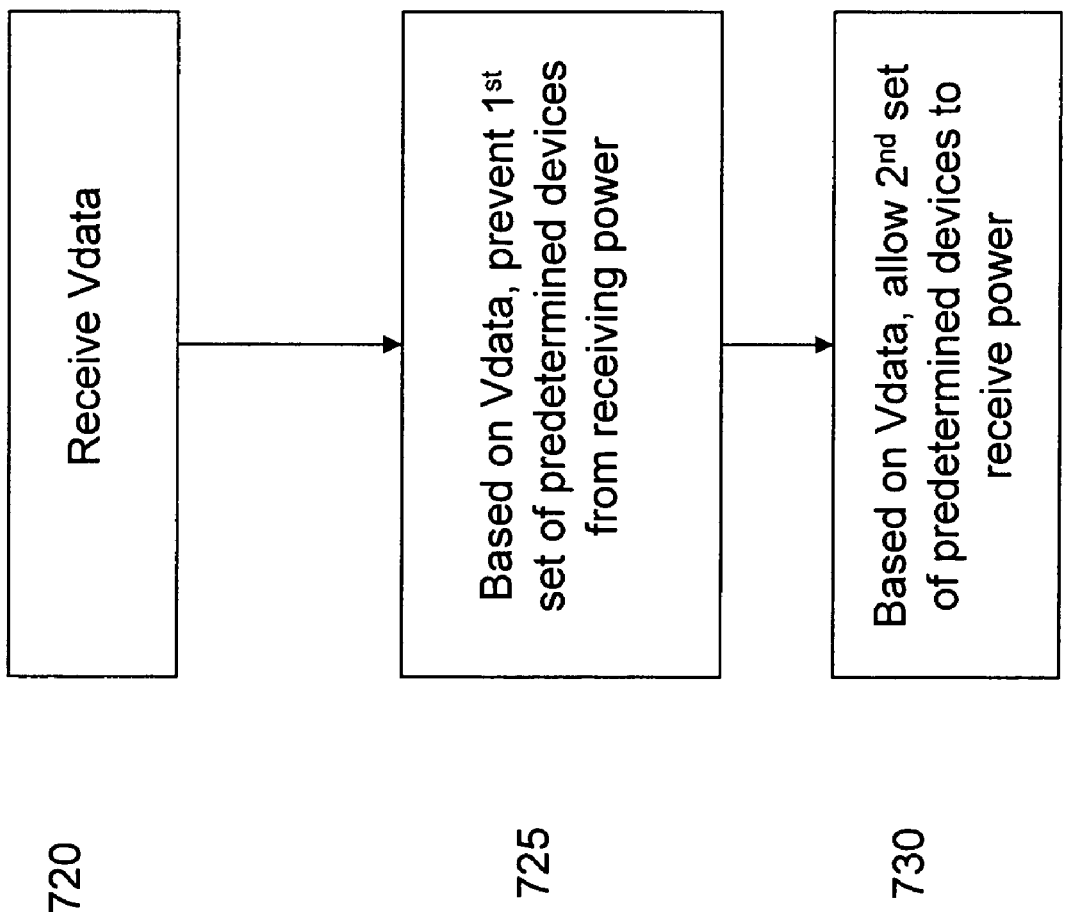

DC POWER SOURCE DETERMINATION CIRCUITRY FOR USE WITH AN ADAPTER

BACKGROUND OF THE INVENTION

1. Technical Field

This invention relates to DC power adapters for powering electronic devices.

2. Description of the Related Arts

There are power systems in the art which allow a user to hook up a DC/DC adapter to an automobile outlet, to supply regulated DC power to power an electronic device, such as a notebook computer. Automobile outlets typically provide a DC voltage in a range between 11.0 and 14.1 Volts. Some power systems also allow the user to hook up the DC/DC adapter to an airplane output such as an EMPOWER system, EMPOWER being a line of products sold by Astronics Advanced Electronic Systems for providing power to aircraft seats. An EMPOWER system typically provides a DC voltage in a range between 14.5 and 15.5 Volts.

Accordingly, some DC/DC adapters can be used with both an automobile outlet and the EMPOWER system to provide a regulated DC power to the electronic device such as the notebook computer. Notebook computers often contain lithium ion batteries. Such batteries can be recharged when the notebook computer is hooked up to the DC/DC adapter. For example, if the user is in a car, the user can couple a DC/DC adapter to the notebook computer and to the cigarette lighter outlet to power the notebook computer. The batteries in the notebook computer will draw some of the DC power supplied to recharge the batteries of the notebook computer if they are low in power. Accordingly, the user can simultaneously use the notebook computer and recharge the batteries therein.

The user can also use the DC/DC adapter while on an airplane, by plugging the DC/DC adapter into the EMPOWER outlet. The EMPOWER outlet and the automobile outlets have different sizes and shapes. Accordingly, the user can directly plug the DC/DC adapter into the EMPOWER outlet, and can place a connector over the EMPOWER plug of the DC/DC adapter and then plug the connector into the automobile cigarette lighter outlet. When the user hooks the DC/DC adapter up to the EMPOWER outlet and then to the electronic device, the electronic device receives the regulated DC power. However, if the charging circuitry in the battery malfunctions, the battery can overheat or even catch on fire when recharging from an EMPOWER DC source. If the battery were to catch on fire while an airplane in which the emPlower outlet is located is flying, the fire would have the potential to cause the airplane to crash or cause substantial damage.

To address this problem, one system in the art provides a connector to connect between the DC/DC adapter and the notebook computer to inform the notebook computer not to recharge the batteries. FIG. 1 illustrates a power supply system according to the prior art. As shown a DC power source 100 is coupled to a DC/DC adapter 105 via a cable 102. The DC/DC adapter 105 receives power from the DC power source 100 and outputs regulated DC power to an electronic device 120, via a cable 110 and a connector 115 coupled to the end of the cable 110.

The DC/DC adapter 105 can provide three output pins to the electronic device 120, as shown in FIGS. 2A and 2B of the prior art. The first pin can provide the output voltage (i.e., $V_{out}$), the second pin can provide a ground reference (i.e., GND), and the third pin can provide a data line (i.e., $V_{data}$) to instruct the notebook as to whether the batteries should be recharged or not. For example, as shown in FIG. 2A, $V_{data}$ could be tied to GND to indicate that the DC power source 100 is the EMPOWER system and therefore the battery should not be recharged. Alternatively, as shown in FIG. 2B, $V_{data}$ could also be left open (i.e., to provide a non-grounded floating voltage) when the DC power source 100 in a cigarette lighter outlet of an automobile. Accordingly, when using the DC/DC adapter 105 while in an automobile, the user would use a connector 115 having the $V_{data}$ line floating, and when using the DC/DC adapter 105 with the EMPOWER system of an airplane, the user would use a connector 115 having the $V_{data}$ line tied to GND.

However, problems arise when the user forgets to change replace the connector 115 for use with the automobile when the user is in an airplane. Accordingly, if the user has the wrong connector 115 attached when using with the EMPOWER system, a battery of an electronic device 120 such as a notebook computer can charge the battery even when used with the EMPOWER system, and if the charging circuitry of the battery malfunctions, overheating or even a fire can occur, resulting in damage to the notebook computer. Also, if the connector 115 is damaged or flawed, then it may not provide the correct $V_{data}$ signal to the notebook computer, allowing the notebook computer to recharge the batteries in an airplane when they shouldn't be allowed to do so.

Accordingly, current DC/DC power adapter systems are deficient because they are incapable of automatically and intelligently informing an electronic device 120 coupled thereto of the DC power source (i.e., the EMPOWER system or an automobile cigarette lighter outlet).

BRIEF DESCRIPTION OF THE DRAWINGS

FIG. 2A illustrates a first connector to coupled a power supply system to an electronic device according to the prior art;

FIG. 2B illustrates a second connector to coupled a power supply system to an electronic device according to the prior art;

FIG. 5A illustrates comparison circuitry according to an embodiment of the invention;

FIG. 5B illustrates comparison circuitry according to an additional embodiment of the invention;

FIG. 7B illustrates a method of receiving $V_{data}$ and allowing power to flow to devices within the electronic device based on $V_{data}$ according to an embodiment of the invention.

DETAILED DESCRIPTION

An embodiment of the present invention is directed to a power supply system to determine a DC power source (e.g., an automobile cigarette lighter outlet or an EMPOWER airplane outlet) coupled thereto and send a signal indicative of the power source to an electronic device coupled thereto. The electronic device may be a notebook computer or other portable consumer electronic device, for example. Based on the signal sent to the electronic device, the electronic device may control the amount of power drawn to prevent overheating. For example, when a notebook computer is hooked up and the power source is the EMPOWER system, the electronic device may disable charging of the internal batteries of the notebook computer, in order to prevent damage or overheating of the batteries due to malfunction or failure. The DC power source may be determined by voltage comparison circuitry, such as a comparator, or by a voltage comparison device including a processor.

Figure 1:
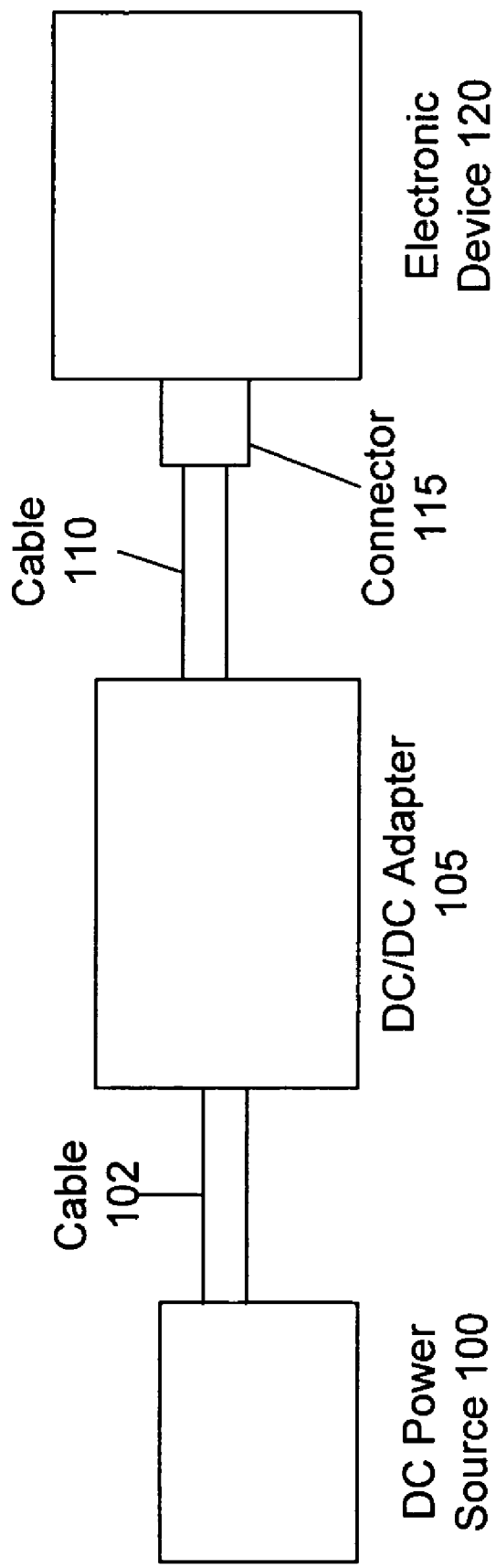
FIG. 1 illustrates a power supply system according to the prior art.
Figure 3:
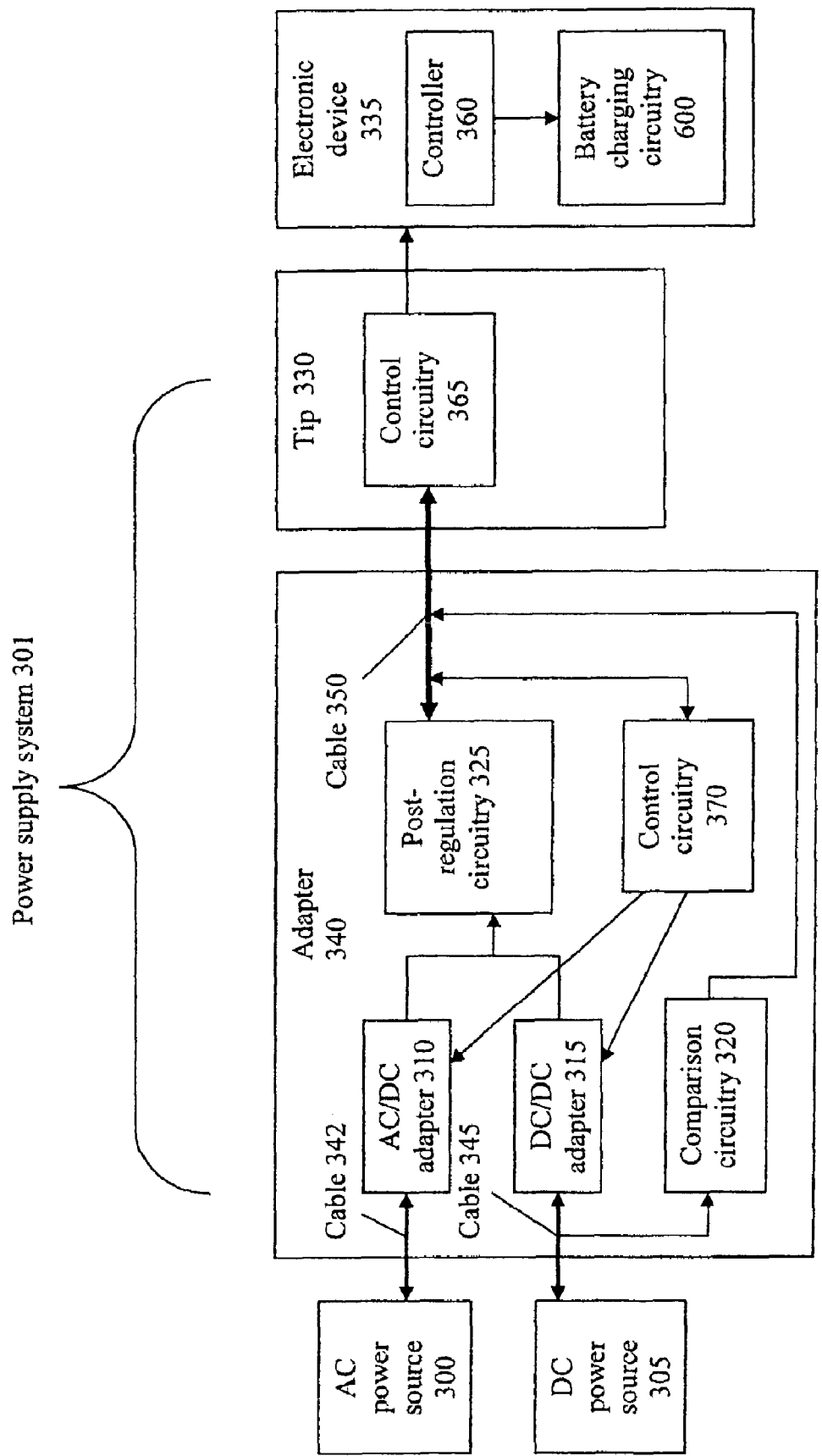
FIG. 3 illustrates a power supply system according to an embodiment of the invention.

FIG. 3 illustrates a power supply system 301 according to an embodiment of the invention. As shown, the adapter 340 may be used with an AC power source 300 or a DC power source 305. In other embodiments, only a DC power source 305 may be utilized to supply power. The AC power source 300 may be coupled to an AC/DC adapter 310 via a cable 342. The DC power source 305 may be coupled to both a DC/DC adapter 315 and comparison circuitry 320 via a cable 345. The DC power source 305 may be an automobile's cigarette lighter outlet or an airplane's EMPOWER system outlet, for example. AC/DC adapter 310 may convert AC power from the AC power source 300 into regulated DC power, which is supplied to post-regulation circuitry 325. The post-regulation circuitry 325 may provide an output voltage ($V_{out}$) and a ground reference (GND) to a tip 330 coupled to the adapter 340 via a cable 350, as further explained below with respect to FIGS. 4A and 4B. The tip 330 may be coupled to an electronic device 335 to provide the power thereto from the power supply system 301. The tip 330 may be removable from the cable 350 and may be inserted into a power input opening of the electronic device. Tips 330 may have different shapes and sizes, depending up the shape and sizes of the power input openings of the respective electronic devices 335 being powered. The tip 330 may also include control circuitry 365 to provide a signal to control circuitry 370 of the adapter 340. The signal may be sent to the control circuitry 370 via the cable 350. In one embodiment, the control circuitry 365 of the tip 330 may include digital components to provide a digital signal the control circuitry 370 of the adapter 340. The digital signal may be utilized to set the magnitude of $V_{out}$, and limit the amount of current which may be drawn from the adapter 340. The post-regulation circuitry 325 regulates the voltage to what the tip 330 tells it to provide.

Alternatively, the tip 330 may include analog components and may provide voltage programming and current programming voltages ($V_{Vprogram}$ and $V_{Iprogram}$, respectively) to the adapter 340. $V_{Vprogram}$ may be utilized to set the magnitude of $V_{out}$. For example, there may be a linear relationship between $V_{Vprogram}$ and $V_{out}$ where $V_{out}$ is 3 times as large as $V_{Vprogram}$. Accordingly, if $V_{Vprogram}$ had a magnitude of 3.0 Volts, $V_{out}$ would have a magnitude of 9.0 Volts, and if $V_{Vprogram}$ had a magnitude of 3.0 Volts, $V_{out}$ would have a magnitude of 6.0 Volts. The analog circuitry may contain passive or active components.

Accordingly, regardless of whether the tip 330 has analog or digital control circuitry, a single adapter 340 may be used to supply power to a plurality of different electronic devices 335 having different power requirements.

The adapter 340 may also include comparison circuitry 320. The comparison circuitry 320 may compare a magnitude of a voltage received from the DC power source 305 with a reference voltage to determine whether the DC power source 305 is an automobile cigarette lighter outlet or an EMPOWER airplane outlet. As stated above, automobile cigarette lighter outlets typically provide a DC voltage having a magnitude within the range of 11.0 Volts and 14.1 Volts. An EMPOWER airplane outlet typically provides a DC voltage having a magnitude within the range of 14.5 and 15.5 Volts. Accordingly, the reference voltage may be set at a level between the high end of the automobile cigarette light outlet voltage (i.e., 14.1 Volts) and the low end of the EMPOWER airplane outlet voltage (i.e., 14.5 Volts). For example, the reference voltage may be set at 14.3 Volts. Accordingly, if the magnitude of the DC power source is greater than 14.3 Volts, then the comparison voltage may determine that the received DC voltage has a greater magnitude than the reference voltage and the DC power source 305 is therefore the EMPOWER airplane outlet. However, if the magnitude of the DC power source is less than 14.3 Volts, then the comparison voltage may determine that the received DC voltage has a smaller magnitude than the reference voltage and the DC power source 305 is therefore the automobile cigarette lighter outlet.

The comparison circuitry 320 may output a signal $V_{data}$ based upon whether the DC power source is determined to be the automobile cigarette lighter outlet or the EMPOWER airplane outlet. For example, the comparison may output 5 Volts if the automobile cigarette lighter outlet is detected, and 0.0 Volts if the EMPOWER airplane outlet is detected. In alternative embodiments, different voltages for $V_{data}$ may be used. In additional embodiments, the comparison circuitry 320 may output a digital signal, such as a stream of bits, indicative of the DC power source 305. $V_{data}$ may be sent via cable 350 to the tip 330, and straight over to the electronic device 335. The electronic device 335 may include a controller 360 which is responsive to $V_{data}$. For example, if the electronic device 335 is a notebook computer and $V_{data}$ is indicative of the EMPOWER airplane outlet system, the controller 360 may disable battery charging circuitry 600, thereby preventing recharging of the batteries. And if the $V_{data}$ is indicative of the automobile cigarette lighter outlet as the DC power source 305, the controller 360 may enabled battery charging circuitry to allow the batteries to be recharged.

Although FIG. 3 illustrates an adapter 340 which includes both a AC/DC adapter and a DC/DC adapter, other embodiments may include only a DC/DC adapter, and no AC/DC adapter.

Figure 4A:
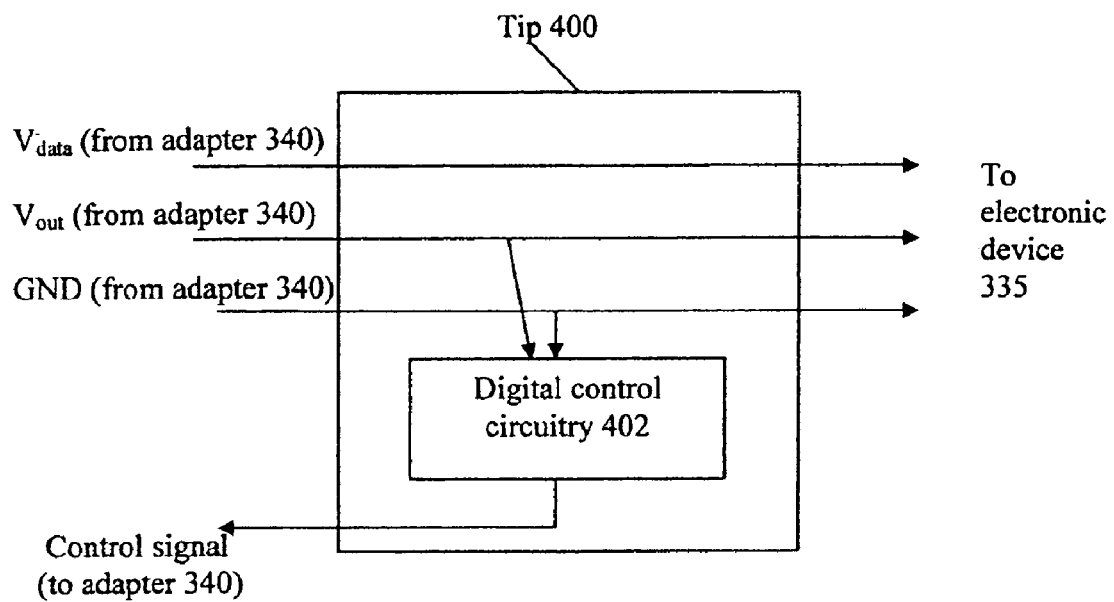
FIG. 4A illustrates a tip having digital control circuitry according to an embodiment of the invention.

FIG. 4A illustrates a tip 400 having digital control circuitry 402 according to an embodiment of the invention. As shown, the tip 400 receives $V_{data}$, $V_{out}$ and GND from the adapter 340 and allows them to all flow to the electronic device 335. The digital control circuitry 402 may receive the $V_{out}$ and GND signals and may output a control signal to the adapter 340 to set the magnitude of $V_{out}$ and limit the current provided. The control signal may be sent to the adapter 340 via the cable 350 between the tip 330 and the adapter 340. The digital control circuitry 402 may include a processor and a memory device, for example. In some embodiments, the tip 400 may be separable from cable 350, and in other embodiments, the tip 400 may be physically part of the cable 350.

Figure 4B:
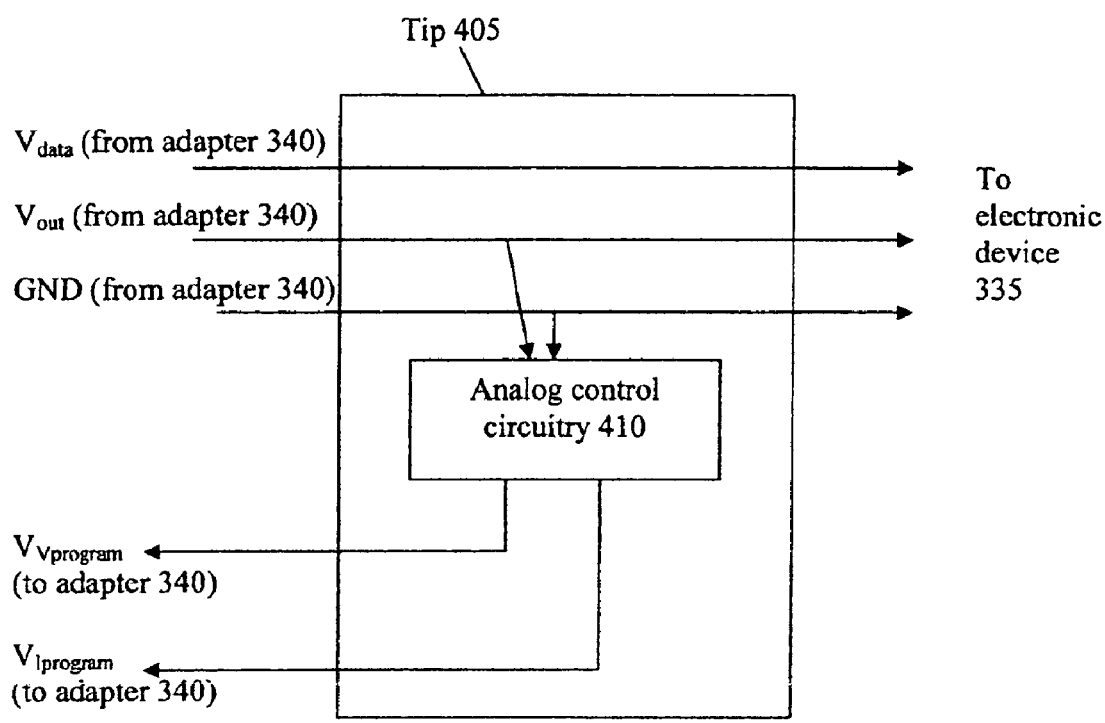
FIG. 4B illustrates a tip having analog control circuitry according to an embodiment of the invention.

FIG. 4B illustrates a tip 405 having analog control circuitry 410 according to an embodiment of the invention. As shown, the tip 405 receives $V_{data}$, $V_{out}$ and GND from the adapter 340 and allows them to all flow to the electronic device 335. The analog control circuitry 410 may receive the $V_{out}$ and GND signals and may output $V_{Vprogram}$ and $V_{Iprogram}$ to the adapter 340. $V_{Vprogram}$ and $V_{Iprogram}$ may be sent to the adapter 340 via the cable 350 between the tip 405 and the adapter 340. The analog control circuitry 400 may include passive or active components, for example. In some embodiments, the tip 400 may be separable from cable 350, and in other embodiments, the tip 400 may be physically part of the cable 350.

FIG. 5A illustrates comparison circuitry 320 according to an embodiment of the invention. As shown, the comparison circuitry 320 includes a comparator 500. The comparator 500 receives (a) the DC power signal from the DC power source 305, and (b) a reference voltage, $V_{ref}$. The comparator outputs $V_{data}$ based on whether the magnitude of the DC power from the DC power source exceeds $V_{ref}$, as described above with respect to FIG. 3.

FIG. 5B illustrates comparison circuitry 320 according to an additional embodiment of the invention. As shown, the comparison circuitry 320 includes a processor 505. The processor 505 receives (a) the DC power signal from the DC power source 305, and (b) value of a reference voltage stored in memory. The processor 505 then outputs $V_{data}$ based on whether the magnitude of the DC power from the DC power source exceeds $V_{ref}$ as described above with respect to FIG. 3. The processor 505 may output a single high or low voltage (e.g., 5.0 Volts or 0.0 Volts) based on the detected DC power source. Alternatively, the processor 505 may output a stream of bits to indicate the DC power source.

Figure 6:
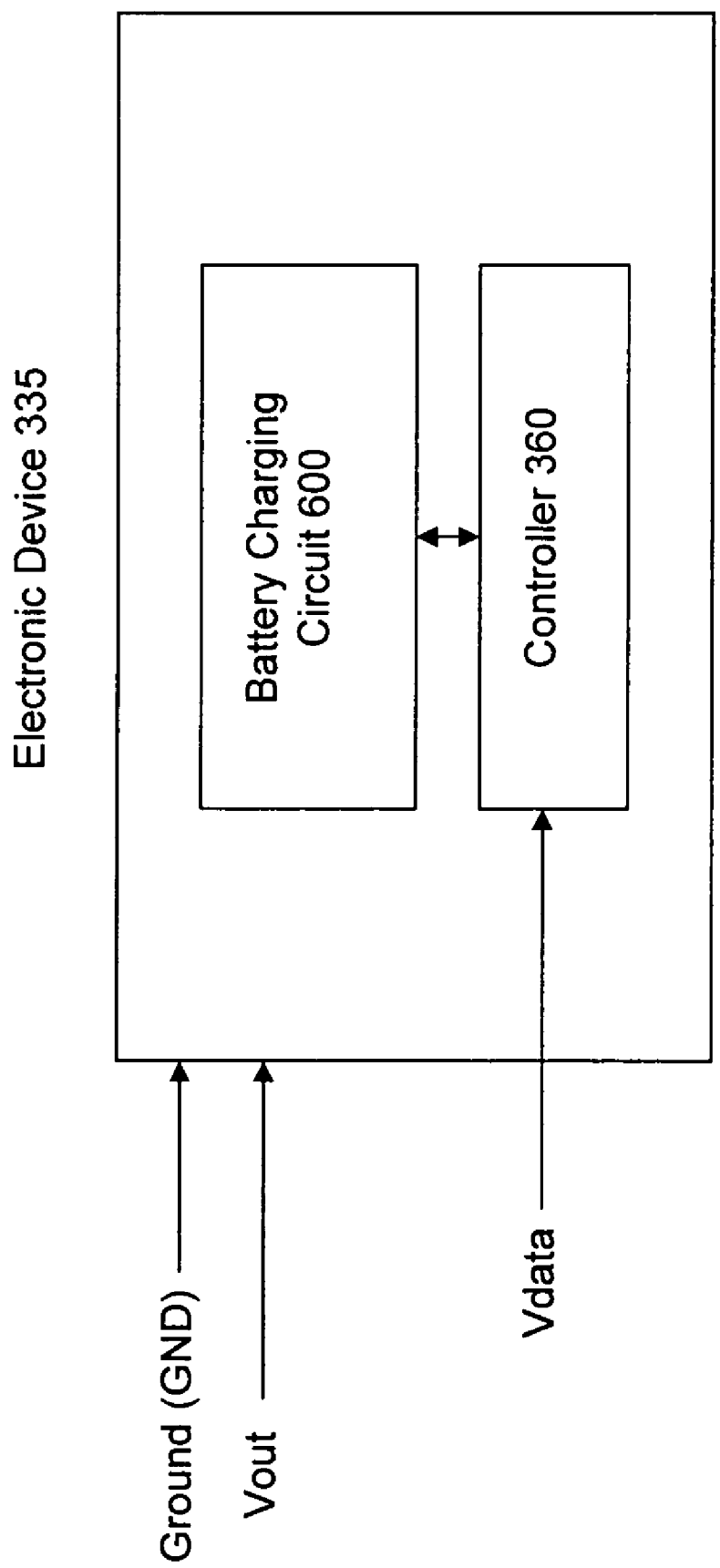
FIG. 6 illustrates an electronic device according to an embodiment of the invention.

FIG. 6 illustrates an electronic device 335 according to an embodiment of the invention. As shown, the electronic device 335 may receive GND, $V_{out}$ and $V_{data}$ from the tip 330. $V_{data}$ may be received by a controller 360. The controller 360 may disable battery charging circuitry 600 of the electronic device 335 from charging batteries when $V_{data}$ is indicative of the EMPOWER outlet. Alternatively, the controller 360 enable battery charging circuitry 600 so that the batteries of the electronic device may be charged on $V_{data}$.

Figure 7A:
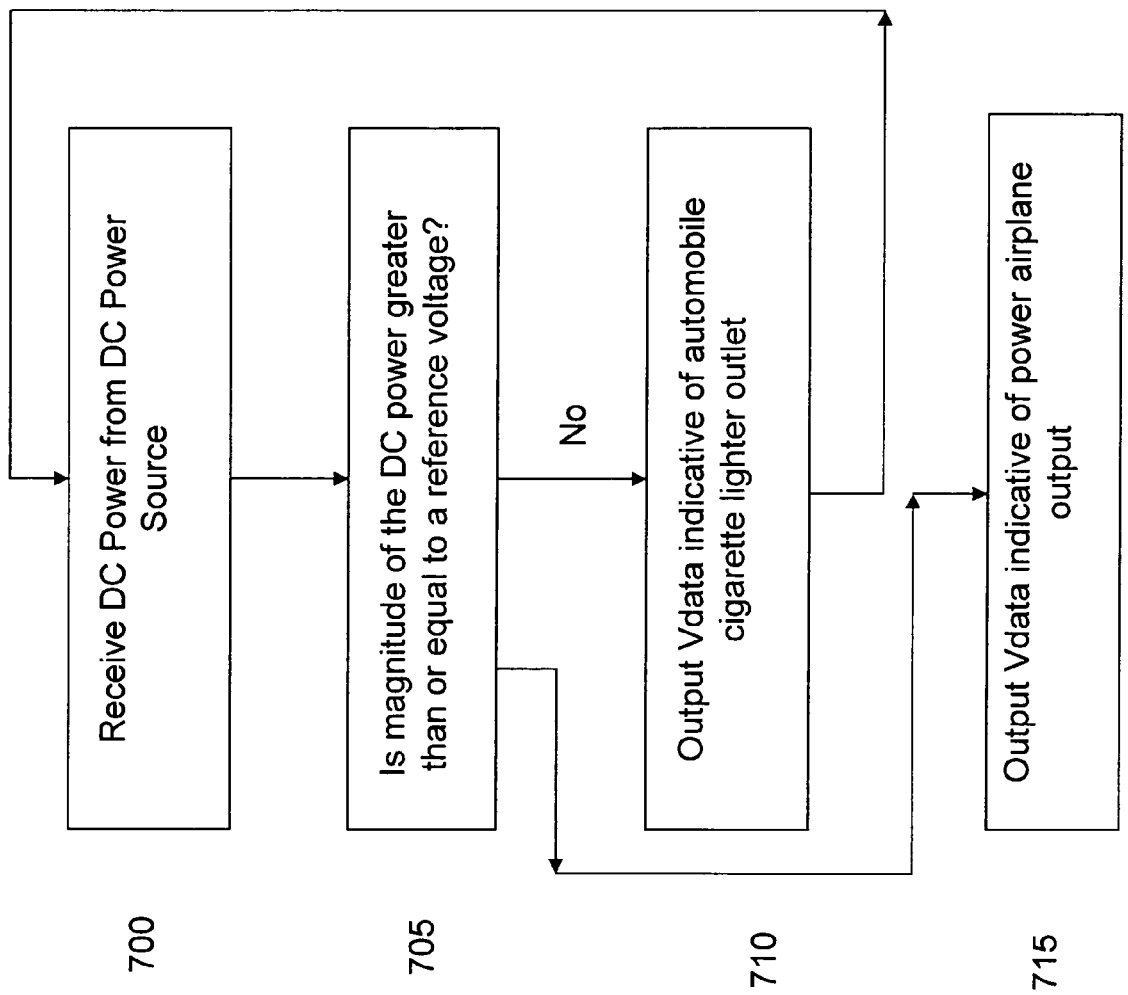
FIG. 7A illustrates a method of determining and outputting $V_{data}$ according to an embodiment of the invention.

FIG. 7A illustrates a method of determining and outputting $V_{data}$ according to an embodiment of the invention. The processing shown in FIG. 7A may be implemented by the adapter 340. First, DC power is received 700 from the DC power source 305. Next, the comparison circuitry determines 705 whether the magnitude of the voltage of the DC power received is greater than $V_{ref}$. If "no," the comparison circuitry determines the DC power source 305 to be an automobile cigarette lighter outlet, and processing proceeds to operation 710, where $V_{data}$ is output with a signal/voltage magnitude indicating that the DC power source 305 is the automobile cigarette lighter outlet. Processing then returns to operation 700. If "yes," at operation 705, processing proceeds to operation 715, where $V_{data}$ is output with a signal/voltage magnitude indicating that the DC power source 305 is the EMPOWER airplane outlet.

FIG. 7B illustrates a method of receiving $V_{data}$ and allowing power to flow to devices within the electronic device 335 based on $V_{data}$ according to an embodiment of the invention. First, the electronic device 335 receives 720 the $V_{data}$ signal. As discussed above, the $V_{data}$ signal is sent from the adapter 340 through the tip 330 and over to the control circuitry 365 of the electronic device 335. Next, based on the $V_{data}$ signal, a first set of predetermined devices may be prevented 725 from receiving power. For example, if the electronic device 335 is a notebook computer, the control circuitry 365 may prevent batteries from recharging if Vdata indicates that the DC power source is the EMPOWER airplane outlet. Other devices/components in the electronic device 335 may also be prevented from receiving power or from functioning in a certain way.

At operation 730, a second set of predetermined device may be allowed to receive power based on the Vdata signal. For example, if Vdata indicates that the DC power source is an automobile cigarette lighter outlet, then power may be available to batteries of the electronic device 335 to allow recharging. Other devices/components in the electronic device 335 may also be allowed to receive power or function in a particular way.

In embodiments described above, the $V_{data}$ signal may be used to send a signal to the control circuitry 365 indicating the DC power source. This signaling may be done via a discrete bit, an analog signal, a data signal line, an analog voltage, or via any other suitable manner. The $V_{data}$ signal may be transmitted from the adapter 340 to the tip 330 and electronic device 335 via a single signaling line or multiple signaling lines.

Figure 8:
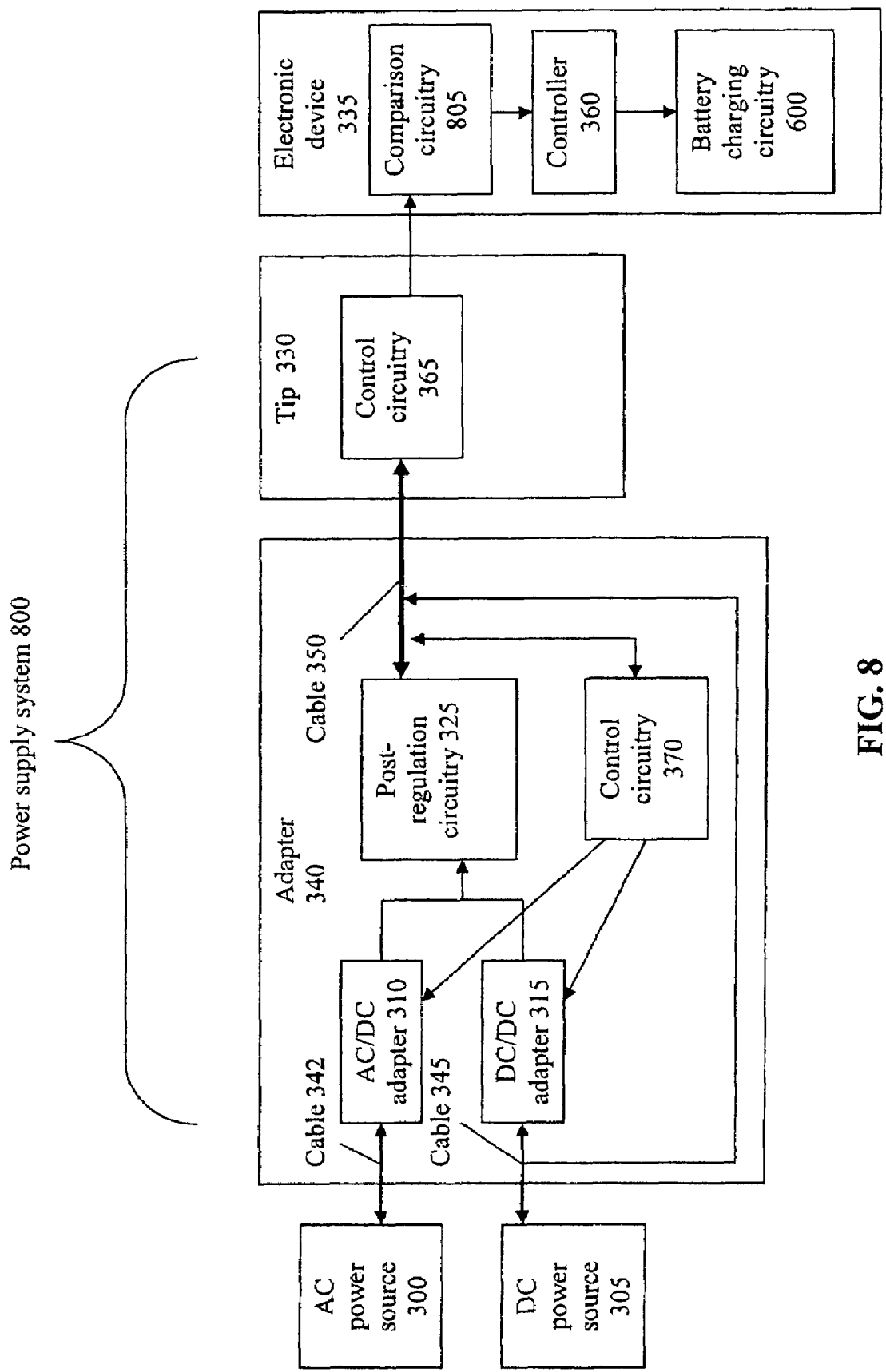
FIG. 8 illustrates a power supply system according to an embodiment of the invention.

FIG. 8 illustrates a power supply system 800 according to an embodiment of the invention. The power supply system 800 is similar to the power supply system 301 shown in FIG. 3. However, unlike the power supply system 301, in which the adapter 340 itself contains comparison circuitry 370, the adapter 340 of power supply system 800 does not contain the comparison circuitry 805. Instead, a regular adapter 340 may be used and the electronic device 335 itself includes the comparison circuitry 805 for determining the DC power source. The electronic device 335 may be a notebook computer and may implement the methods shown in FIGS. 7A and 7B.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An adapter device, comprising:
   a DC/DC adapter, located in an external casing to a portable computer having a power supply, to receive DC power from an external DC power source, and output a regulated DC voltage ($V_{out}$) to the portable computer; and
   DC source determination circuitry, in the adapter device, to receive the DC power from the external DC power source and compare a magnitude of a voltage of the DC power with a reference magnitude of a reference voltage ($V_{ref}$) in order to determine what type of external DC power source is supplying DC power,
   wherein when the magnitude of the voltage of the DC power is greater than the reference magnitude, a data signal ($V_{data}$) having a first value indicative of the external DC power source being an airplane power source is output to the portable computer along with the regulated DC voltage, and when the magnitude of the voltage of the DC power is less than the reference magnitude, the data signal ($V_{data}$) having a second value indicative of the external DC power source being an automobile power source is output to the portable computer along with the regulated DC voltage.

2. The adapter device according to claim 1, the magnitude of the DC power being in a range between about 11.0 Volts and about 14.1 Volts.

3. The adapter device according to claim 1, the magnitude of the DC power being in a range between about 14.5 Volts and about 15.5 Volts.

4. The adapter device according to claim 1, further including an AC/DC adapter to receive AC input power and convert the AC input power to an additional DC power signal.

5. The adapter device according to claim 1, the data ($V_{data}$) signal being selected from the group consisting of: (a) a transmission of a discrete bit, (b) a transmission of a data signal having multiple bits, (c) an analog signal, and (d) an analog voltage.

6. A method comprising:

receiving DC power from a DC power source, at an adapter which is in an external casing separate from a portable computer, and outputting a regulated DC voltage ($V_{out}$) from the adapter to the portable computer;

comparing, in the adapter, a magnitude of a voltage of the DC power with a reference magnitude of a reference voltage ($V_{ref}$) to identify what type of DC power source is supplying the DC power to the adapter;

outputting a data signal ($V_{data}$) having a first value along with the regulated DC voltage to the portable computer when the magnitude of the voltage of the DC power is greater than the reference magnitude which identifies that the DC power source is an airplane power source; and outputting the data signal ($V_{data}$) having a second value along with the regulated DC voltage to the portable computer when the magnitude of the voltage of the DC power is less than the reference magnitude which identifies that the DC power source is an automobile power source.

7. The method according to claim 6, the magnitude of the DC power being in a range between about 11.0 Volts and about 14.1 Volts.

8. The method according to claim 6, the magnitude of the DC power being in a range of between about 14.5 Volts and about 15.5 Volts.

9. The method according to claim 6, the adapter further including an AC/DC converter capable of receiving AC input and converting the AC input into a DC voltage.

10. The method according to claim 6, the data signal $V_{data}$ being selected from the group consisting of: (a) a transmission of a discrete bit, (b) a transmission of a data signal having multiple bits, (c) an analog signal, and (d) an analog voltage.

11. A power supply system, comprising:

an adapter device to receive DC power from an external DC power source, and to output a regulated DC voltage, the adapter device including:

DC source determination circuitry to receive the DC power from the external DC power source and compare, in the adapter device, a magnitude of a voltage of the DC power with a reference magnitude of a reference voltage in order to determine a type of external DC power source that is supplying the DC power, wherein when the magnitude of the voltage of the DC power is greater than the reference magnitude, a data signal having a first value indicative of the external DC power source being an airplane power source is output along with the regulated DC voltage, and when the magnitude of the voltage of the DC power is less than the reference magnitude, the data signal having a second value indicative of the external DC power source being an automobile power source is output along with the regulated DC voltage; and a portable computer having control circuitry to receive the data signal and the regulated DC voltage.

12. The power supply system according to claim 11, wherein when the data signal has the first value, the portable computer operates in a first mode where battery charging circuitry is disabled, and when the data signal has the second value, the battery charging circuitry is enabled.

13. The power supply system according to claim 11, the magnitude of the DC power being in a range between about 11.0 Volts and about 14.1 Volts.

14. The power supply system according to claim 11, the magnitude of the DC power being in a range between about 14.5 Volts and about 15.5 Volts.

15. The power supply system according to claim 11, the adapter device further including an AC/DC adapter to receive AC input power and convert the AC input power to an additional DC power signal.

16. The power supply system according to claim 11, the data signal being selected from the group consisting of: (a) a transmission of a discrete bit, (b) a transmission of a data signal having multiple bits, (c) an analog signal, and (d) an analog voltage.

* * * * *